United States Patent [19]
Luecke

[11] Patent Number: 5,289,445
[45] Date of Patent: Feb. 22, 1994

[54] SUSPENSION SYSTEM FOR FOCUS ACTUATOR OF AN OPTICAL DISK DRIVE

[75] Inventor: Francis S. Luecke, San Jose, Calif.

[73] Assignee: International Business Machines Corporation, Armonk, N.Y.

[21] Appl. No.: 834,045

[22] Filed: Feb. 11, 1992

[51] Int. Cl.⁵ .............................................. G11B 7/00
[52] U.S. Cl. .............................. 369/44.15; 369/44.16; 369/44.22
[58] Field of Search .......................... 369/44.14–44.22, 369/247, 244, 251, 249

[56] References Cited

U.S. PATENT DOCUMENTS

| | | | |
|---|---|---|---|
| 4,557,564 | 12/1985 | van Rosmalen | 350/247 |
| 4,592,037 | 5/1986 | Ohnuki | 369/44.15 |
| 4,633,456 | 12/1986 | Luecke | 369/45 |
| 4,745,589 | 5/1988 | Nomura | 369/45 |
| 4,769,803 | 9/1988 | Yamamiya | 369/46 |
| 4,908,816 | 3/1990 | Champagne et al. | 369/215 |
| 5,046,820 | 7/1991 | Saekusa et al. | 369/44.15 |
| 5,136,558 | 8/1992 | Getreuer et al. | 369/44.22 |

FOREIGN PATENT DOCUMENTS

| | | |
|---|---|---|
| 3931261 | 3/1990 | Fed. Rep. of Germany . |
| 61-20277 | 1/1986 | Japan . |
| 63-131335 | 10/1988 | Japan . |
| 63-200321 | 12/1988 | Japan . |
| 1-91330 | 7/1989 | Japan . |
| 1-205736 | 11/1989 | Japan . |

OTHER PUBLICATIONS

IBM Technical Disclosure Bulletin vol. 23, No. 1, Jun. 1980.
IBM Technical Disclosure Bulletin vol. 19, No. 9, Feb. 1977.
IBM Technical Disclosure Bulletin vol. 23, No. 12, May 1981.

Primary Examiner—Aristotelis Psitos
Assistant Examiner—Nabil Hindi
Attorney, Agent, or Firm—Baker, Maxham, Jester & Meador

[57] ABSTRACT

An optical focus actuator for a data storage system having an adjustable optical lens includes support member having top and bottom surfaces and a central throughbore extending between the top and bottom surfaces, an elongated movable lens support bobbin disposed in the throughbore, an electromagnetic actuator disposed between the support member and the movable lens support bobbin for moving the lens for adjustment thereof, and a wire support comprising a plurality of upper wire loops extending in opposed directions and looped about an upper end of the movable support bobbin and a plurality of lower loops extending in opposed directions and looped about a lower end of the movable support bobbin, the loops being supported at both ends by said support member.

36 Claims, 4 Drawing Sheets

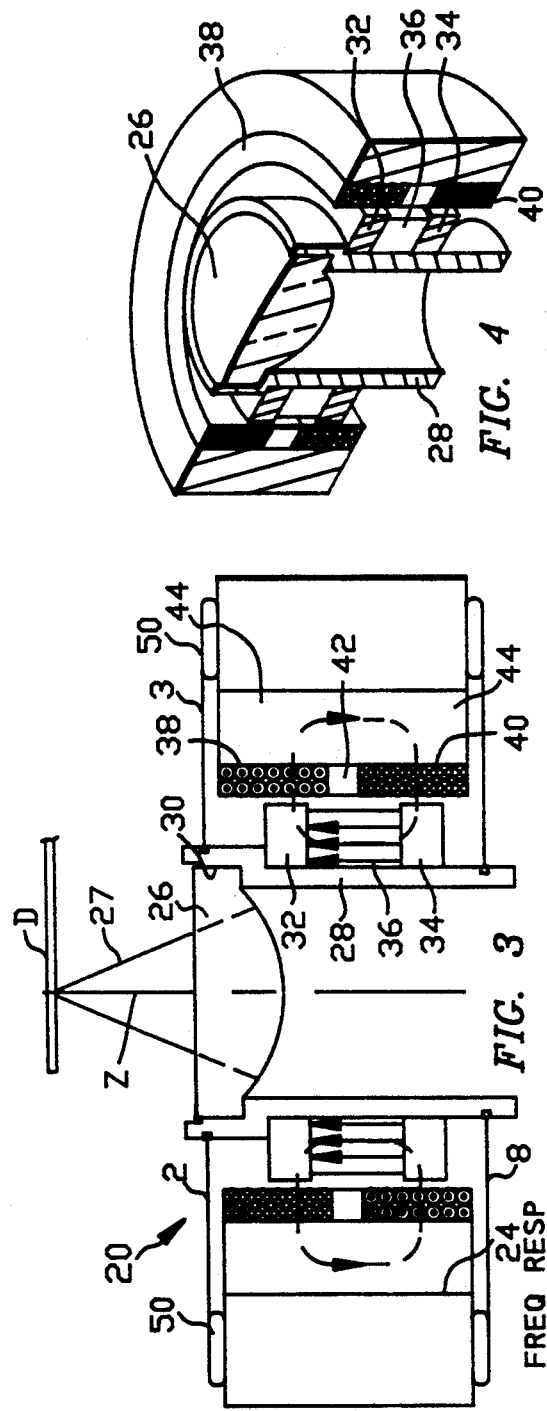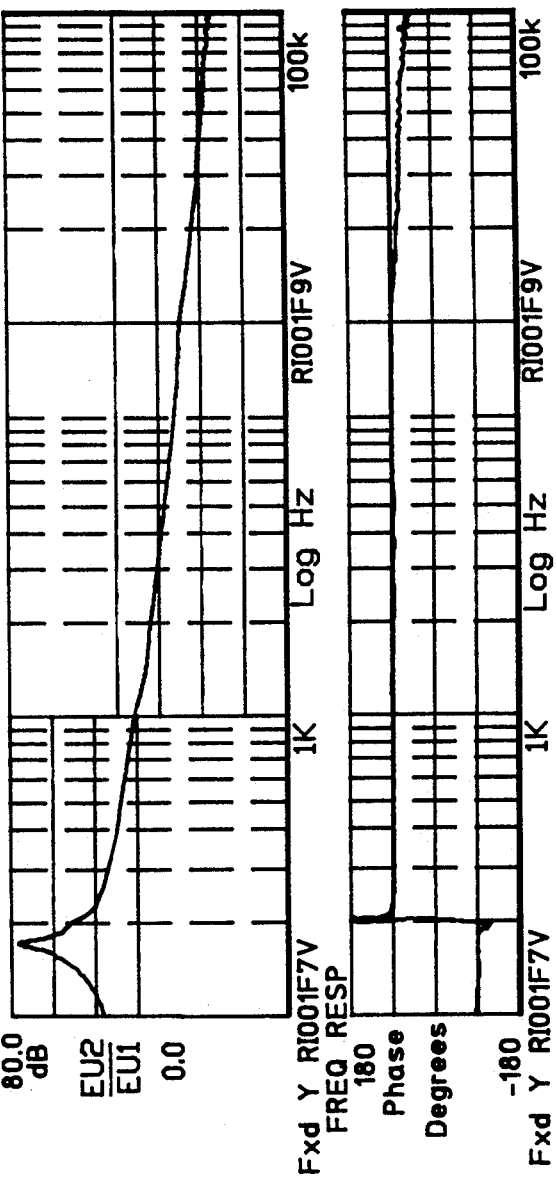

SUSPENSION SYSTEM FOR FOCUS ACTUATOR OF AN OPTICAL DISK DRIVE

BACKGROUND OF THE INVENTION

The present invention relates to the storage and retrieval of information from optical media and pertains particularly to an improved high bandwidth focus actuator and suspension system for use in an optical disk drive.

Optical disk drives are in widespread use and include video disk drives used in video applications as well as optical disk drives that serve as a peripheral memory storage devices in computer systems. The latter category includes write-once-read-mostly (WORM) drives, CD-ROM drives and magneto-optic (erasable) drives.

In one form of optical media, information is encoded in concentric or spiral tracks on the surface of a disk by physically altering minute regions of the media to change the reflectivity thereof. Data is written and read from the optical media utilizing a laser beam which is reflected off of the media. It is critical to maintain the laser beam in focus at the appropriate level of the optical media.

Optical focusing systems are well known for this purpose and typically include an optical head having an adjustable objective lens to allow focusing of a laser beam onto a storage media. Typically the lens is directly driven by an electromagnetic motor such as a voice coil motor (VCM). The lens is usually mounted on a movable portion of the motor. The suspension of the lens mount is critical and must allow for very precise vertical movement.

For some applications, it is desirable to have an objective lens move only in the axial direction to maintain focus and not move in other directions. It is also highly desirable for the structure to have minimum resonances.

One frequently used approach is a plain bearing constraint and a moving VCM. However, hardware using this approach may suffer from wear and stick slip induced non-repeatability of motion. Adequate constraint of tilt and lateral motion is difficult.

Another approach uses a moving magnet for generating the force and a cantilever arrangement which allows for horizontal displacement. Such a system is disclosed in U.S. Pat. No. 4,633,456.

The prior art systems have a number of drawbacks including low efficiency and inadequate bandwidth. Another drawback is lack of adequate constraint against lateral motion and tilt. It is therefore desirable that an improved suspension system and high performance actuator be available for use in the optical head of an optical disk drive system.

SUMMARY AND OBJECTS OF THE INVENTION

It is the primary object of the present invention to provide an improved high bandwidth focus actuator and suspension system for use in an optical disk drive.

In accordance with a primary aspect of the present invention an optical focus actuator comprises a stationary support member having a throughbore extending between a top and a bottom thereof, an elongated movable support bobbin disposed in the throughbore with a unitary elongated wire anchored at both ends to the fixed support member and alternately looped about upper and lower ends of the movable support bobbin.

BRIEF DESCRIPTION OF THE DRAWINGS

The above and other objects and advantages of the present invention will become apparent from the following description when read in conjunction with the accompanying drawings wherein:

FIG. 3 is an enlarged diagrammatic sectional view taken on line 3—3 of FIG. 2.

FIG. 4 is an enlarged perspective view, in vertical section of the voice coil motor of the embodiment of FIG. 1.

FIGS. 11 and 12 are transfer function Bode plots of the performance of an actuator constructed in accordance with FIGS. 1-4.

DETAILED DESCRIPTION OF A PREFERRED EMBODIMENT

Figure 1:
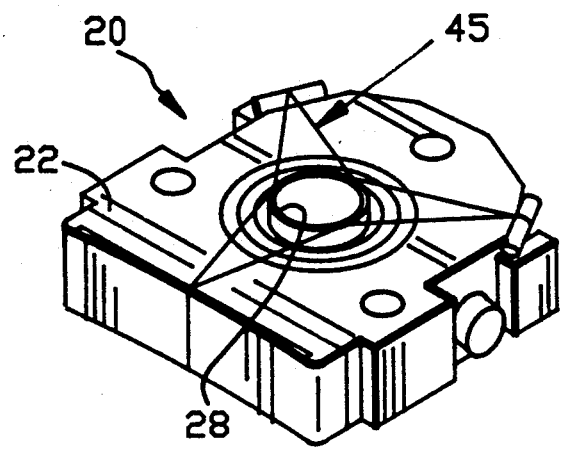
FIG. 1 is a perspective view of an optical focus actuator showing a preferred embodiment of the invention.

Referring now to FIGS. 1-4, an optical focus actuator is illustrated and designated generally by the numeral 20. It comprises a stationary support member 22 having a central aperture 24 as best seen in FIG. 3. An electromagnetic motor or moving magnet VCM moves an objective lens 26 for focusing a laser beam 27 onto optical media in the form of rotating disk D. The lens 26 is supported in an upper end of an aluminum bobbin 28 in the form of a tubular sleeve with an annular recess defined by a flange 30 at the upper end in which the lens 26 is mounted.

The VCM is axially symmetrical (i.e., symmetrical about the Z axis) and comprises a pair of iron inner poles 32 and 34 (FIG. 3) of a circular ring configuration which are bonded to the outside of the bobbin 28 in spaced apart relation with a permanent magnet 36 bonded therebetween. This assembly constitutes the moving part of the VCM. A pair of coils 38 and 40 are wound such that the flow of current in the upper coil is opposite to that in the lower coil. The coils are separated by a spacer 42 and bonded to the inner diameter of an outer pole 44. The field resulting from current flowing through the coils 38 and 40 interacts with the field of the permanent magnetic circuit in such a way as to move the lens 26 up or down to effect focusing of the laser beam. The lines of flux are illustrated by dashed lines in FIG. 3. Solid arrows depict the magnetization of the permanent magnets.

Figure 5:
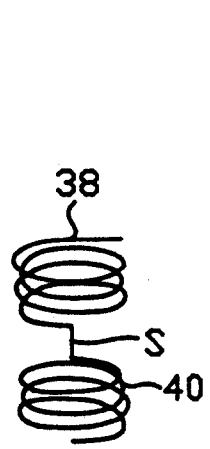
FIG. 5 is a diagrammatic view showing the winding of a pair of coils in the embodiment of FIGS. 1-4 from a single strand of wire.

The coils 38 and 40 are preferably wound simultaneously from a single wire as illustrated in FIG. 5. They are wound on a temporary cylindrical support structure (not illustrated). The coil 38 winds in the opposite direction of the coil 40. The coils are wound simultaneously by securing segment S to the mandrel and turning the mandrel. They are connected by segment S.

It will be appreciated that the drawings herein are not to scale and that the actual structure is very small compared to the illustrated embodiment. For example, the lens has a radius of about 2 mm. The lens has a mass of about 0.058 grams and the bobbin has a mass of about 0.054 grams. The optimum construction is such as to minimize the moving mass.

The moving portion of the VCM is supported by a suspension wire system for permitting it to move in the axial (Z-axis) direction but constraining it from moving in a lateral (X or Y) direction or tilting. The suspension wire system is also completely symmetrical about the Z axis. This symmetrical configuration with the center of gravity on the Z axis eliminates tilt modes or motions.

Figure 2:
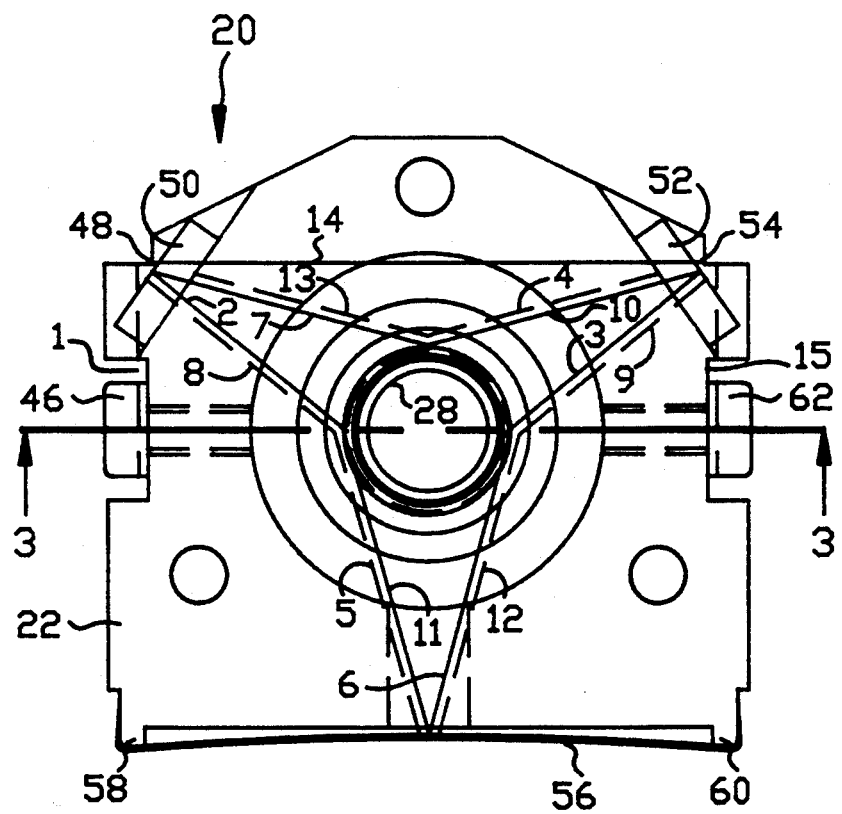
FIG. 2 is an enlarged top plan view of the embodiment of FIG. 1.

As can best be seen in FIGS. 1 and 2, a continuous wire 45 of the suspension system forms an alternate series of loops about the upper and lower ends of the bobbin 28 and forms the geometric configuration of a three point star in plan or top view. FIG. 2 illustrates the top visible loops of the wire in solid lines. The bottom hidden loops of the wire are illustrated in dashed lines. It will be appreciated that the loops alternate between the top and bottom of the support member 22.

In FIG. 2, the numerals 1–15 are utilized to identify the legs or runs of the suspension wire 45. One end of the wire is attached to the base of the support member 22 by means of a screw 46 on one side thereof. A run or leg 1 extends beneath a portion of the support member through a notch 48 and across a cylindrical pin or dowel 50. From the dowel 50 a run or leg 2 extends at an angle toward, and loops around, the upper end of bobbin 28. From the bobbin a run or leg 3 extends toward the upper right across a dowel 52. From the dowel 52 a run or leg extends down via notch 54 to the bottom of the support member 22. From the notch 54 a run or leg 4 extends along the bottom or back of the support member and loops around the bobbin 28. The wire then forms leg 5 which extends down to, and up across, the face of a leaf spring 56. The leaf spring 56 extends across one side of the support member 22 and is supported on outer projections 58 and 60 to provide a preloaded yieldable support for the wire 45. It will be apparent that other forms of preload may be utilized, such as tension and compression springs.

The wire 45 (FIG. 2) then extends from the bottom of the support member 22 up across the front of the leaf spring 56 to leg 6 on the top thereof. The wire then extends to, and around, the bobbin 28 to leg 7 which extends over to, and down, notch 48 to the bottom of the support member 22. Leg 8 continues at the bottom to, and loops around, the bottom portion of the bobbin 28 to leg 9 which terminates at notch 54. The wire continues upward from the bottom along the back through notch 54 to leg 10 on the top. The wire then loops around the bobbin 28 again to run or leg 11. There it extends to the leaf spring 56 and down the front thereof to leg 12. The leg 12 extends to, and loops around, the bobbin 28 to leg 13. It then extends to, and over, notch 48 and up over pin 52 to leg or run 14. Next the wire extends across to notch 54 down below the support member to the leg or run 15 which extends to a screw 62. The terminal end of the wire 45 is securely anchored to the support member 22 via screw 62. Thus, a single wire anchored at opposite ends forms the entire multiple loop wire suspension system. The wire is preferably stainless steel spring wire.

The upper and lower loops all respectively lie in a common plane with the upper and lower planes being parallel. The spring 56 gives the lens support the capability of vertical movement for focusing a laser beam on, for example, the disk D shown in FIG. 3. This suspension supports the lens support and constrains it against independent lateral movement. It will be appreciated, however, that the lens support moves in a very slight arc as it is moving vertically within the suspension. This, however, can be easily compensated for by the fine tracking actuator within the system.

The loops can each be made from a separate wire and the number can vary from that shown. However, the single wire multiple loop system as illustrated and described is preferred. Preliminary measurements on two prototypes of the FIGS. 1-3 unit show an efficiency of about 2,000 $g^2$ per watt. The VCM may be constructed with either a moving coil or a moving magnet motor. However, the moving magnet wherein the coils or windings are stationary is preferred. This construction eliminates the running of wires to get power to a moving member. It also enables the construction of a lower mass armature for the motor. This provides a much stiffer construction and a more linear frequency response with a wider bandwidth than prior art systems.

The efficiency of the VCM, usefully quantified as G squared per watt, is determined by the properties of the magnetic circuit and the coil and the proportioning of the VCM elements to the payload and support elements. The transformation of motor force to the payload (in this case the objective lens) must be done with as little delay as possible. This delay in transmission establishes the fundamental upper limit of useful bandwidth for any actuator. The amount of delay is determined by the configuration of the structure connecting the force to the payload and by the modulus and density of the materials from which the structure is made. A maximum bandwidth results from maximizing structural stiffness and material modulus and minimizing material mass. The aforementioned described unit is designed with these parameters in mind.

Other embodiments of the VCM are illustrated in FIGS. 6–10. These variations have advantages that will be briefly discussed.

Figure 6:
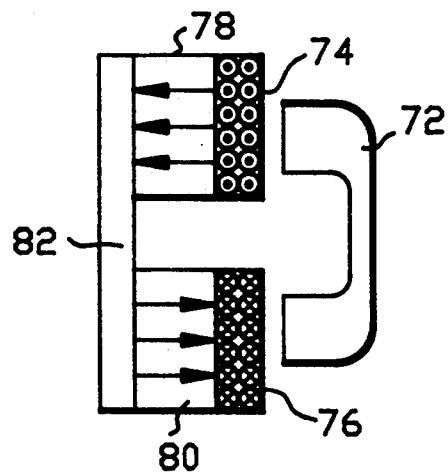
FIGS. 6-10 are diagrammatic views illustrating alternative voice coil motor configurations.

Referring to FIG. 6, the armature or movable working portion of the motor comprises soft iron magnet member 72 having a general spool configuration with enlarged upper and lower rim portions adjacent the upper and lower coils 74 and 76. A pair of circular or ring-like permanent magnets 78 and 80 of opposite polarity are spaced vertically from one another, positioned adjacent the coils 74 and 76 and secured to the inner surface of an outer pole 82. This configuration enables one to greatly increase the size or power of the magnet sources 78 and 80 yet reduce the movable mass which includes the soft iron member 72.

Figure 7:
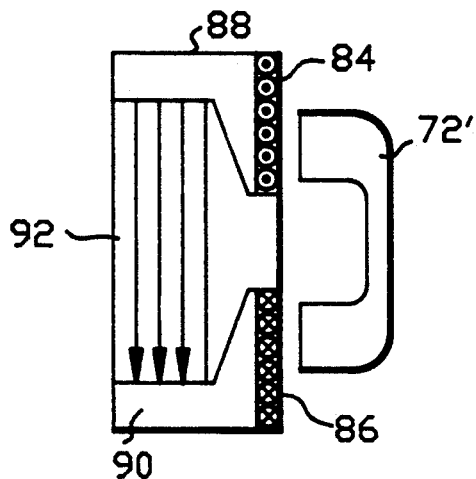

Referring to FIG. 7, another embodiment with the fixed permanent magnets and outer stationary coils is also illustrated. In this embodiment, a movable armature member 72' identical to the previous embodiment is mounted in conjunction with a stator assembly comprising upper coil 84 and a lower coil 86 formed on an inner diameter of upper and lower pole pieces 88 and 90. A large circular ring permanent magnet 92 is disposed between the upper and lower outer poles 80 and 90. This arrangement also enables one to utilize a very large and powerful permanent magnet source.

Figure 8:
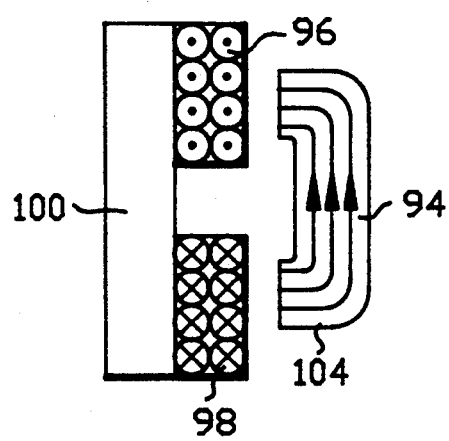

Referring to FIG. 8, a moving magnet unit is illustrated wherein a magnet 94 has a general spool configuration with the poles at the rims oriented adjacent upper and lower coils 96 and 98. The coils are spaced vertically apart and secured to a circular outer pole 100. This arrangement utilizes a single moving magnet with the poles oriented and positioned adjacent the coils 96 and 98.

Figure 9:
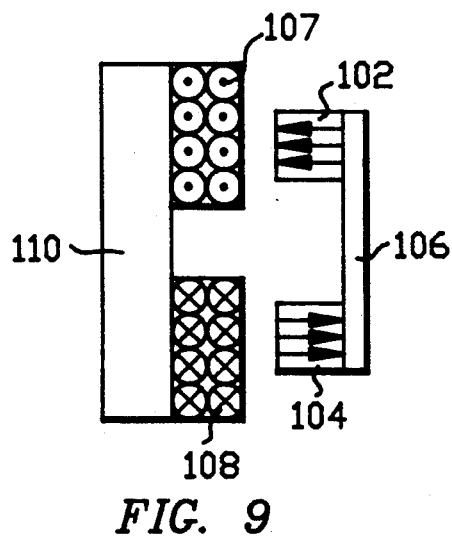

Referring to FIG. 9, an embodiment is illustrated having a pair of vertically spaced apart circular or ring magnets 102 and 104 of opposed polarity secured on the outer diameter of an inner pole 106. The permanent magnets 102 and 104 are each positioned and oriented respectively adjacent upper coil 107 and lower coil 108. The coils are vertically spaced and secured to the inner diameter of an outer annular pole member 110.

Figure 10:
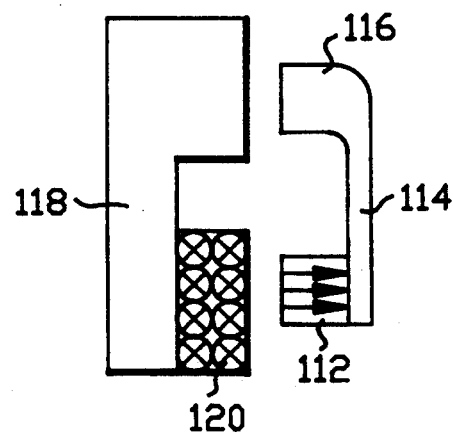

Referring to FIG. 10, an embodiment is illustrated wherein a single permanent magnet 112 is mounted to a movable pole 114 having an upper end formed as a radial rim 116 disposed adjacent a large portion of a fixed outer pole 118. The permanent magnet 112 is positioned adjacent and oriented with respect to a single coil 120 disposed or positioned at the lower end of the assembly away from the lens. This provides a reduced leakage flux at the lens focal point.

The motor constructions of FIGS. 6–10 provide highly compact and efficient motors that are particularly useful in conjunction with symmetric mounts as disclosed herein.

Transfer function Bode plots of an actuator constructed in accordance with FIGS. 1–4 are shown in FIGS. 11 and 12 showing the frequency performance of the system. FIG. 11 illustrates a curve showing amplitude vs. frequency. The curve of FIG. 12 illustrates phase vs. frequency.

As will be appreciated from viewing the plot of the transfer function in FIGS. 11 and 12, the present system provides a very high bandwidth actuator for moving the lens. The system also gives a very efficient transmission of the force to the payload. There is minimal delay in the transmission which establishes the fundamental upper limit of usable bandwidth for the actuator. The bandwidth achievable results from maximizing the structural stiffness in material modulus and minimizing the material masses in a system. The simplicity of the system and its VCM structures provides for economical manufacture.

Figure 13:
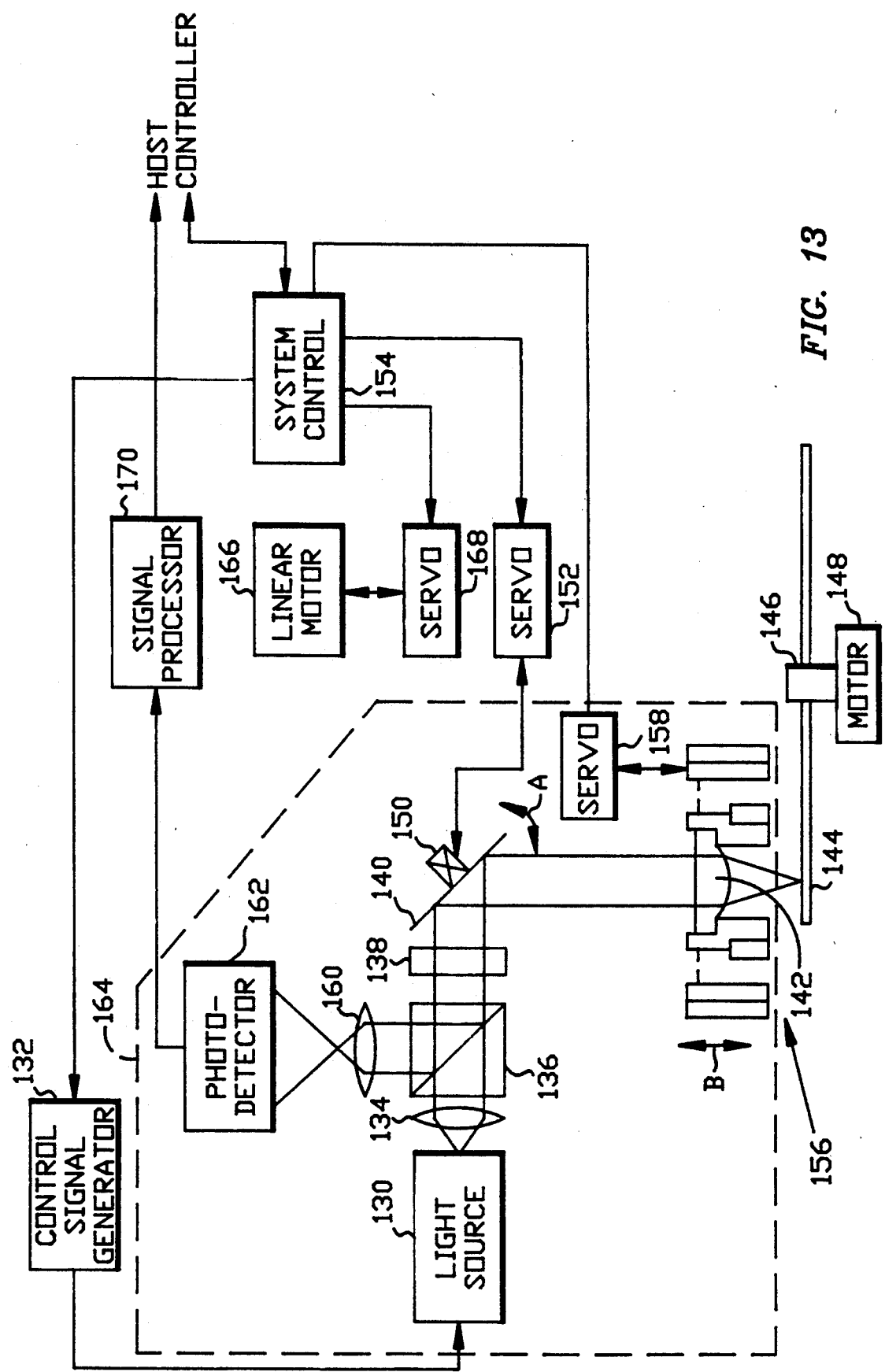
FIG. 13 is a block diagram of an optical disk drive system incorporating the optical focus actuator of FIGS. 1-4.

My invention may be incorporated into an optical disk drive system, as shown in FIG. 13. A light source 130 such as a laser is energized by a control signal generator 132. The light beam from the light source 130 is transmitted through a lens 134, a beam splitting prism 136, and a quarter-wave plate 138 to a galvano-mirror 140. The light beam is reflected by the galvano-mirror 140 and focused by an objective lens 142 onto an optical disk 144. The optical disk 144 is supported by a spindle 146 connected to a motor 148 for rotating the disk about a drive axis perpendicular to the plane of the disk. The galvano-mirror 140 is pivotally mounted and moveable through an angle illustrated by the double arrow labeled A in FIG. 13. This movement of the galvano-mirror is accomplished via solenoid 150 to move the light beam in a radial direction on the disk in order to follow an information track encoded thereon. The solenoid 150 is driven by a servo circuit 152 connected to a system control 154.

The objective lens 142 (FIG. 13) is moved toward and away from the disk 36 as illustrated by the double arrow labeled B in FIG. 13. This movement of the objective lens along an axis perpendicular to a plane of the disk 144 is accomplished by means of a VCM 156 energized by another servo circuit 158 connected to the system control 154. The objective lens 142 and the VCM 156 are configured in the same manner as the focus actuator illustrated in FIGS. 1–4.

The optical disk 144 (FIG. 13) comprises a conventional underlying optical media and an overlying cover plate of either plastic or glass having a thickness of, for example, 0.6 mm. The objective lens 142 is moved toward and away from the optical disk 144 in order to focus the light beam into a spot on the optical media. Information is encoded on the media in binary form in concentric tracks or in a spiral track. In one conventional form of optical media, the data is encoded as a succession of pits and islands which correspond to ones and zeros.

The system control 154 (FIG. 13) also commands the control signal generator 132 which drives the light source 130. The light beam reflected from the optical disk 144 is passed through the objective lens 142 back to the galvano-mirror 140. The mirror reflects the light beam through beam-splitting prism 136 via the quarter-wave plate 138. The beam splitting prism 136 reflects the beam through a lens 160 to a photo-detector 162. The elements enclosed by the phantom line in FIG. 13 reside in an optical head 164. This head is moved radially across the disk for track selection as illustrated by the double arrow labeled C in FIG. 13. The movement is accomplished utilizing a linear motor 166 driven by a servo circuit 168 connected to the system control 154.

The photo-detector 162 comprises a suitable transducer, such as a photo-diode, for detecting the intensity of light in the reflected beam. The output signal from the detector 162 is sent to a signal processor 170 which generates data signals representative of the information encoded on the optical media and sends them to a host controller. The system control 154 of the optical disk drive system is also under command of the host controller.

While I have illustrated and described my invention through specific embodiments, it should be understood that numerous changes and modification may be made therein without departing from the spirit and scope of this invention as defined in the appended claims. I further assert and sincerely believe that the above specification contains a written description of the invention and the manner and process of making and using it, in such full, clear, concise and exact terms as to enable any person skilled in the art to which it pertains to make and use the same and, further, that it sets forth the best mode contemplated by me for carrying out my invention.

I claim:

1. A mounting system for mounting and constraining an optical lens for movement in an axial direction comprising:
    a support member having top and bottom surfaces and a central aperture extending between said top and bottom surfaces;
    an elongated movable lens support bobbin disposed in said aperture the moveable lens support bobbin having a periphery and upper and lower ends; and
    wire support means for interconnecting the movable lens support bobbin and the support member, the wire support means engaging the movable lens support bobbin along the periphery so as to form a plurality of loops about each of the upper and lower ends, the plurality of loops forming a three pointed star around the bobbin.

2. A mounting system for mounting and constraining an optical lens for movement in an axial direction comprising:

a support member having top and bottom surfaces and a central aperture extending between said top and bottom surfaces;

an elongated movable lens support bobbin disposed in said aperture the moveable lens support bobbin having a periphery and upper and lower ends; and wire support means for interconnecting the movable lens support bobbin and the support member, the wire support means engaging the movable lens support bobbin along the periphery so as to form a plurality of loops about each of the upper and lower ends, the wire support means is arranged to form three loops about each of said upper and lower ends of said moveable support bobbin.

3. A mounting system for mounting and constraining an optical lens for movement in an axial direction comprising:

a support member having top and bottom surfaces and a central aperture extending between said top and bottom surfaces;

an elongated movable lens support bobbin disposed in said aperture the moveable lens support bobbin having a periphery and upper and lower ends; and wire support means for interconnecting the movable lens support bobbin and the support member, the wire support means engaging the movable lens support bobbin along the periphery so as to form a plurality of loops about each of the upper and lower ends, the wire support means includes a unitary wire which is anchored at both ends to said support member and which extends alternately back and forth between the upper and lower ends of said movable lens support bobbin to form three loops about each of the upper and lower ends of the movable lens support bobbin.

4. A mounting system according to claim 3 wherein the upper loops normally lie in a common upper plane, and the lower loops normally lie in a common lower plane, and said upper and said lower planes are parallel.

5. A mounting system according to claim 3 wherein said upper loops and said lower loops each form a three pointed star in plan view.

6. A mounting system according to claim 4 wherein said upper loops and said lower loops each form a three pointed star in plan view.

7. A mounting system according to claim 2 wherein the ends of each of said loops are supported on said support member at positions one hundred and twenty degrees about an axis of the lens support bobbin.

8. A mounting system according to claim 3 wherein said wire is stainless steel spring wire.

9. A mounting system according to claim 1 further comprising electromagnetic means mounted to said support member for moving said elongated movable lens support bobbin.

10. A mounting system for mounting and constraining an optical lens for movement in an axial direction comprising:

a support member having top and bottom surfaces and a central aperture extending between said top and bottom surfaces;

an elongated movable lens support bobbin disposed in said aperture the movable lens support bobbin having a periphery and upper and lower ends; and wire support means for interconnecting the movable lens support bobbin and the support member, the wire support means engaging the movable lens support bobbin along the periphery so as to form a plurality of loops about each of the upper and lower ends, the loops comprise a unitary wire arranged and forming three loops about each of said upper and lower ends of said moveable support bobbin, said upper loops normally lie in a common plane, and said lower loops normally line in a common plane, and said upper loops and said lower loops normally lie in parallel planes.

11. In a focus actuator for a data storage system having an adjustable optical lens, a mounting system for mounting and constraining said optical lens for movement in an axial direction comprising:

a support member having top and bottom surfaces and a central aperture extending between said top and bottom surfaces;

an elongated movable optical lens support bobbin disposed in said aperture;

electromagnetic means disposed between said support member and said movable lens support bobbin for moving said lens for adjustment thereof; and wire support means comprising three upper wire loops extending in opposed directions and looped about an upper end of said movable support bobbin and three lower loops extending in opposed directions about a lower end of said movable support bobbin, said loops supported at both ends by said support member.

12. A mounting system according to claim 11 wherein said wire support means comprises a unitary elongated wire anchored at both ends to said support member and forming multiple upper and lower loops alternately extending about upper and lower ends of said movable support bobbin.

13. A mounting system according to claim 12 wherein said upper loops normally lie in a common upper plane, said lower loops normally lie in a common lower plane, and said upper and said lower planes are parallel.

14. A mounting system according to claim 13 wherein said electromagnetic means comprises:

a permanent magnet directly coupled to said lens support bobbin; and a coil mounted to said support member adjacent said aperture and surrounding said lens support bobbin.

15. A mounting system according to claim 14 wherein said electromagnetic means further comprises:

a pair of iron poles directly coupled to said support bobbin on opposite sides of said permanent magnet; and a second coil mounted to said support member adjacent said aperture and surrounding said lens support bobbin.

16. A mounting system according to claim 11 wherein said electromagnetic means comprises:

two axially spaced coils, at least one annular permanent magnet; and a soft iron spool.

17. In a focus actuator for a data storage system having an optical lens adjustable by a voice coil motor, a system for mounting and constraining the optical lens for movement solely in an axial direction comprising:

a support member having top and bottom surfaces and a central throughbore extending between said top and bottom surfaces;

a movable support bobbin disposed in said throughbore;

a coil mounted to said support member in said throughbore and surrounding said lens support bobbin;

a permanent magnet connected to said movable support bobbin; and wire support means comprising a unitary elongated stainless steel spring wire anchored at both ends to said support bobbin and alternately forming one of a plurality of upper loops and one of a plurality of lower loops extending about each of said upper and lower ends of said movable support bobbin, one end of each of a pair of said upper loops and one end of a pair of said lower loops being supported by a spring mounted to the support member for preloading said loops, said upper loops and said lower loops each forming a three pointed star in plan view, said upper loops normally lying in a common upper plane, said lower loops normally lying in a common lower plane, and said upper and lower common planes being parallel.

18. An optical disk drive, comprising:

means for rotating an optical disk about a drive axis;

optical means supported adjacent the optical disk rotating means for generating a light beam and reflecting it off the surface of the optical disk, including a support member having a central aperture, a movable bobbin disposed in said aperture carrying said lens, a plurality of wire legs arranged in loops and forming three pointed stars about top and bottom ends of the bobbin for connecting the bobbin to the support member, and an electromagnetic actuator for moving the bobbin within the support member to focus the light beam on the disk;

servo means connected to the electromagnetic actuator for causing the bobbin to move up and down to focus the light beam on the optical disk;

detector means for receiving the light beam after it has been reflected by the optical disk and for generating an output signal representative of information encoded thereon; and information recovery means for processing the output signal and generating data signals representative of the information encoded on the optical disk.

19. An optical disk drive system comprising:

means for rotating an optical disk about a drive axis;

optical means supported adjacent the optical disk rotating means for generating a light beam and reflecting it off the surface of the optical disk, including a support member having a central aperture, a movable bobbin disposed in said aperture carrying said lens, a plurality of wire legs arranged to form three loops about each of an upper and lower end of said bobbin for connecting the bobbin to the support member, and an electromagnetic actuator for moving the bobbin within the support member to focus the light beam on the disk;

servo means connected to the electromagnetic actuator for causing the bobbin to move up and down to focus the light beam on the optical disk;

detector means for receiving the light beam after it has been reflected by the optical disk and for generating an output signal representative of information encoded thereon; and information recovery means for processing the output signal and generating data signals representative of the information encoded on the optical disk.

20. An optical disk drive system according to claim 18 wherein said wire legs comprise a unitary elongated wire anchored at both ends to said support member and formed into a plurality of upper loops and lowers loops alternately looped about said upper and lower ends of said moveable bobbin.

21. An optical disk drive system according to claim 20 wherein said upper loops and said lower loops each form a three pointed star in plan view.

22. A mounting system for mounting and constraining an optical lens for movement in an axial direction comprising:

a support member having top and bottom surfaces and a central aperture extending between said top and bottom surfaces;

an elongated movable lens support bobbin disposed in said aperture;

wire support means comprising a plurality of upper wire legs connected between an upper end of said movable support bobbin and said support member and a plurality of lower wire legs connected between a lower end of said movable support bobbin and said support member; and the upper and lower legs forming three pointed stars and having ends which are supported by a spring which is connected to the support member for preloading said legs.

23. A mounting system according to claim 22 wherein said spring is a leaf spring.

24. In a focus actuator for a data storage system having an adjustable optical lens, a mounting system for mounting and constraining said optical lens for movement in an axial direction comprising:

a support member having top and bottom surfaces and a central aperture extending between said top and bottom surfaces;

an elongated movable optical lens support bobbin disposed in said aperture;

electromagnetic means disposed between said support member and said movable lens support bobbin for moving said lens for adjustment thereof;

wire support means comprising three upper wire loops extending in opposed directions and looped about an upper end of said movable support bobbin and three lower loops extending in opposed directions about a lower end of said movable support bobbin, said loops supported at both ends by said support member; and the ends of an upper loop and the ends of a lower loop being supported by a spring connected to said support member for preloading said loops.

25. A mounting system according to claim 24 wherein said wire is a stainless steel spring wire; and said spring is a leaf spring extending normal to said axial direction, and the ends of each of said loops are anchored at positions one hundred and twenty degrees about said axial.

26. A mounting system for mounting and constraining an optical lens for movement in an axial direction comprising:

a support member having top and bottom surfaces and a central aperture extending therebetween;

an elongated generally cylindrical movable lens support bobbin disposed in the central aperture, the bobbin including top and bottom end portions; and filament support means, which includes a filament peripherally engaging the top and bottom end portions of the bobbin to form a plurality of loops and three pointed stars, for connecting the bobbin to the support means.

27. A mounting system, as claimed in claim 26, including:
spring means connected to the support member for yieldably supporting the filament; and
the filament support means being connected to the spring means for preloading the loops.

28. A mounting system, as claimed in claim 26, including:
each of the top and bottom end portions of the bobbin having an annular groove; and
the loops engaging the bobbin within said grooves.

29. A mounting system for mounting and constraining an optical lens for movement in an axial direction comprising:
a support member having top and bottom surfaces and a central aperture extending therebetween;
an elongated generally cylindrical movable lens support bobbin disposed in the central aperture, the bobbin including top and bottom end portions; and
filament support means, which includes a filament peripherally engaging the top and bottom end portions of the bobbin to form a plurality of loops, for connecting the bobbin to the support means, the filament support means being arranged to form three upper loops about the top end portion and three lower loops about the bottom end portion of the movable support bobbin.

30. A mounting system as claimed in claim 29 including:
the upper loops normally lying in a common upper plane, the lower loops normally lying in a common lower plane, and the upper and lower planes being substantially parallel; and
the upper loops and the lower loops each forming a respective three pointed star in plan view, the points of each respective three-pointed star being at positions of 120° from one another about the longitudinal axis of the lens support bobbin.

31. A mounting system, as claimed in claim 30, including:
the filament support means extending alternatively back and forth between the top and bottom end portions of the movable support bobbin.

32. A mounting system, as claimed in claim 31, including:
the top end portion having an annular groove;
the bottom end portion of the moveable support bobbin having an annular groove; and
the upper loops and lower loops engaging the bobbin within the upper and lower annular grooves, respectively.

33. A mounting system, as claimed in claim 32, including:
the filament support means including a unitary monofilament which is anchored at both ends to said support member.

34. A mounting system, as claimed in claim 33, including:
electromagnetic means disposed between the support member and the movable lens support bobbin for moving the lens support bobbin longitudinally for adjustment of the lens.

35. An optical disk drive system which includes the mounting system claimed in claim 34 and further includes;
drive means for rotating an optical disk about a drive axis;
optical means supported adjacent the drive means for generating a light beam and reflecting it off a surface of the optical disk;
the optical means including the support member, the lens support bobbin and the filament support means;
servo means connected to the electromagnetic means for moving the bobbin to focus the light beam on the surface;
detector means for receiving the light beam after it has been reflected by the surface and for generating an output signal representative of information encoded on the surface; and
information recovery means connected to the detector means for processing the output signal and generating data signals representative of the information encoded on the surface.

36. A mounting system, as claimed in claim 35, including:
the unitary monofilament being a stainless steel wire; and
spring means connected to the support member and to the wire for preloading said loops.

* * * * *